United States Patent [19]
Iley et al.
[11] Patent Number: 4,818,292
[45] Date of Patent: Apr. 4, 1989

[54] ANTIFOAM INGREDIENT FOR DETERGENT COMPOSITIONS

[75] Inventors: William J. Iley; John W. Yorke, both of Wirral, England

[73] Assignee: Lever Brothers Company, New York, N.Y.

[21] Appl. No.: 93,074

[22] Filed: Aug. 28, 1987

Related U.S. Application Data

[63] Continuation of Ser. No. 901,223, Aug. 28, 1986, abandoned.

[30] Foreign Application Priority Data

Sep. 4, 1985 [GB] United Kingdom ................. 8521956

[51] Int. Cl.$^4$ .......................... C08L 3/00; C09B 3/22; B01J 20/00

[52] U.S. Cl. .................................... 106/210; 106/212; 106/213; 252/358; 252/174.15; 252/174.17; 502/404

[58] Field of Search ............................... 106/210–213; 252/174.15, 174.17, 358; 502/404

[56] References Cited

U.S. PATENT DOCUMENTS

| | | | |
|---|---|---|---|
| 2,687,149 | 8/1954 | Badeau | 140/113 |
| 3,707,503 | 12/1972 | Kenny | 252/117 |
| 3,834,919 | 9/1974 | Parker et al. | 106/213 |
| 3,933,672 | 1/1976 | Bartolotta et al. | 252/116 |
| 4,013,573 | 3/1977 | Leikhim et al. | 252/89 R |
| 4,362,642 | 12/1982 | Carter et al. | 252/174.16 |
| 4,369,308 | 1/1983 | Trubiano | 106/213 |
| 4,421,666 | 12/1983 | Hempel et al. | 252/140 |
| 4,447,349 | 5/1984 | Tai | 252/174.13 |
| 4,451,387 | 5/1984 | Tai | 252/108 |
| 4,530,774 | 7/1985 | Davies et al. | 252/108 |

FOREIGN PATENT DOCUMENTS

| | | |
|---|---|---|
| 000216 | 1/1979 | European Pat. Off. . |
| 008829 | 6/1980 | European Pat. Off. . |
| 71481 | 2/1983 | European Pat. Off. . |
| 094250 | 11/1983 | European Pat. Off. . |
| 109247 | 5/1984 | European Pat. Off. . |
| 114483 | 8/1984 | European Pat. Off. . |
| 2462184 | 2/1981 | France . |
| 2559400 | 8/1985 | France . |
| 1113712 | 5/1968 | United Kingdom . |
| 1492938 | 11/1977 | United Kingdom . |
| 1492939 | 11/1977 | United Kingdom . |
| 1523957 | 9/1978 | United Kingdom . |
| 2040982 | 9/1980 | United Kingdom . |

OTHER PUBLICATIONS

Chemistry & Industry of Starch, Kerr, W. R., 1952, p. 250.
Chem Abst: 105:26,168x, Oct. 85.
German Abstract—DE3013292-A, 15, Oct. 1981.

*Primary Examiner*—Theodore Morris
*Attorney, Agent, or Firm*—Matthew J. McDonald; James J. Farrell

[57] ABSTRACT

A particulate antifoam ingredient suitable for incorporation in a detergent powder product comprises an oily antifoam active substance effective at low wash temperatures, for example, silicone oil/hydrophobic silica or alkyl phosphate/petroleum jelly, on a carrier of swollen hydrated hydrophilic starch. The antifoam ingredient combines improved storage stability and improved flow properties with rapid release of the antifoam active substance at all wash temperatures.

13 Claims, No Drawings

ANTIFOAM INGREDIENT FOR DETERGENT COMPOSITIONS

This is a continuous application of Ser. No. 901,223, filed Aug. 28, 1986, now abandoned.

TECHNICAL FIELD

The invention relates to an antifoam ingredient which is particularly suitable for incorporation into powdered detergent products, and to processes for the production of the antifoam ingredient.

BACKGROUND AND PRIOR ART

Detergent products comprising anionic and/or nonionic surfactants which are particularly suitable for fabric washing generally have a tendency in use to produce excessive foam. This can be a problem particularly with drum-type washing machines, and it is accordingly usual to include an antifoam agent in the detergent formulation to reduce or eliminate this tendency to produce excessive foam.

Excessive foam derived from detergent products containing anionic and/or nonionic surfactants can for example be controlled to a limited extent by the addition of soap, or by the incorporation of certain oils, such as hydrocarbons or silicone oils, or particles such as hydrophobic silica, or mixtures of such materials.

It has for example been proposed in EP 71 481A (Unilever) to provide an antifoam ingredient comprising a core of gelatinised starch having a mixture of a silicone oil and hydrophobic silica sorbed thereon as antifoam active materials. EP 109 247A (Unilever) discloses an antifoam ingredient comprising a core of gelatinised starch carrying a mixture of hydrocarbon oils and waxes and hydrophobic silica.

Although such antifoam particles are highly effective in reducing the tendency of a freshly manufactured detergent product to produce excessive foam, there is still a substantial risk that the antifoam activity will diminish on storage in a detergent powder. This is believed to be due to migration of some of the antifoam active substances, particularly those of an oily nature, from the core material into the surrounding powder or even the packaging material. This can happen more rapidly when such powders are stored at temperatures above room temperature (20° C.), and after a period of storage of a few weeks the activity of the antifoam agent can be severely impaired.

It is accordingly desirable to incorporate the antifoam agents in the detergent powder during manufacture in a form in which they are protected against premature deactivation during storage, so that their effectiveness in controlling excessive foam production, both at low and at high washing temperatures, is not diminished.

FR 2 462 184A (Eurand-France) discloses an antifoam ingredient in the form of granules in which a core of silicone oil is encapsulated by a shell or coating of hydrophilic water-soluble crystalline material, which is preferably a sugar such as lactose or a salt such as sodium chloride. The hard crystalline outer shell of the granules is formed by a recrystallisation process: granules of silicone oil and the hydrophilic coating material are covered with excess powdered coating material and wetted, for example with 3.2% or 6.67% by weight of water, to dissolve out a superficial part of the coating material, and the water is then evaporated off so that a hard film of recrystallised coating material is formed. The graules obtained are essentially in the form of encapsulates having a core of silicone oil completely surrounded by a shell of crystalline coating material. Although starches and starch derivatives are disclosed as usable in the process, it is believed that only highly crystalline starches would in fact exhibit appropriate dissolution and crystallisation properties.

We have now discovered that it is possible to produce starch-based antifoam granules having a reduced tendency to deactivation in storage, while maintaining excellent foam control at both low and high wash temperatures, using a simpler process than that of FR 2 462 184A discussed above. The antifoam granules of the present invention utilise as core material a pregelatinised amorphous starch containing a certain amount (generally about 10%) of water: during the manufacture of the granules, the starch is swollen in a controlled hydration step to entrap the antifoam active substances within, while the granules themselves remain dry. In contrast to the disclosure of FR 2 462 184A mentioned above, the starches used in accordance with the invention are essentially amorphous both before and after the controlled hydration step, and are not dissolved and recrystallised when water is added, but instead swell: the water added in the controlled hydration step is retained within the swollen starch and need not be removed by evaporation as in FR 2 462 184A. It is believed that the pregelatinised amorphous starches used in the present invention could not be used in the process described in FR 2 462 184A.

When incorporated in a detergent powder product the antifoam granules of the present invention show a reduced tendency towards premature loss during storage of any oily antifoam active substance, by migration from within the granules into the dry powder product or even into the packaging. Oily antifoam active substance can be retained within the antifoam granule until the product is contacted with water, for example during the washing of fabrics, when release of the antifoam active substance can be triggered to produce effective control of foam generated by the detergent active present in the detergent powder product as the wash temperature rises. The effectiveness of the antifoam ingredient is thereby retained until it is needed at the point of use.

DEFINITION OF THE INVENTION

Accordingly, the present invention provides a particulate antifoam ingredient suitable for incorporation into a detergent powder composition, the ingredient comprising:

(i) from 30 to 90% by weight (dry weight basis) of a pregelatinised partially hydrated water-swellable hydrophilic starch as a carrier material;

(ii) from 5 to 50% by weight of antifoam active material sorbed on the carrier material, the antifoam active material comprising at least one hydrophobic antifoam active substance at least partially liquid at a temperature within the range of from 5° to 90° C.;

(iii) from 5 to 30% by weight of water.

Preferred ranges for the contents of the various ingredients are as follows:

(i) from 45 to 75% by weight (dry weight basis), more preferably from 49 to 75% by weight, of the hydrophilic starch;

(ii) from 20 to 40% by weight of antifoam active material;

(iii) from 5 to 20% by weight, more preferably from 5 to 17.9% by weight, of water.

The particulate antifoam ingredient of the invention will also be referred to herein for convenience as antifoam granules, but, as explained later, this terminology carries no implication that the particles have any particular size or that they are agglomerates.

The invention further provides a detergent powder composition comprising one or more detergent-active compounds, one or more detergency builders and optionally other conventional ingredients such as bleaching materials, enzymes, fluorescers and perfumes, the detergent powder composition containing from 0.1 to 5% by weight, preferably from 0.5 to 3% by weight, of the particulate antifoam ingredient of the invention.

DESCRIPTION OF THE INVENTION

The antifoam granules of the invention are composed of a core or carrier material - a starch - having sorbed therein an antifoam active material, which may consist of one or more antifoam active substances provided that at least one oily antifoam active substance - that is to say, a hydrophobic material at least partially liquid at a temperature within the range of from 5° to 90° C. - is present.

The Carrier Material

The core or carrier material provides a support for the oily antifoam active substance present. The carrier material is a specific type of hydrophilic starch which is partially hydrated (generally to an extent of about 10% by weight) and which has been rendered cold-water-dispersible by pregelatinisation and/or chemical modification, and is essentially amorphous. The starch is capable of taking up water, in a controlled hydration process, whereby swelling and hardening take place to give gelatinous beads which are superficially dry: this controlled hydration process is utilised, as described in more detail below, in the manufacture of the antifoam granules of the invention. On contact with more water, for example, when the antifoam granules of the invention encounter the wash liquor, further take-up of water occurs with more swelling and the granules break up, thereby releasing the antifoam active material. This process is not strongly temperature sensitive, and antifoam granules in accordance with the present invention have been found to release antifoam active substance effectively at all wash temperatures.

The use of this carrier material has been found, as compared with other starches, to give the major benefit of improved storage stability, and also a secondary benefit of improved flow properties.

The partially hydrated starch used as a starting material for the manufacture of the antifoam granules of the invention will be described for the sake of simplicity as "dry", even though it contains perhaps 10% of water, and references in the present specification to "dry weight basis" should be construed accordingly.

The hydrophilic starch starting material is essentially amorphous, and is believed to remain so throughout the swelling and hydration processes that take place. The initial pregelatinisation will have destroyed any regularity in the structure of the starch.

An example of a pregelatinised starch suitable for use in the present invention is Amijel (Trade Mark) 12014 ex Corn Products Company.

The antifoam active material

The antifoam material sorbed on the starch carrier material in the antifoam granules of the present invention includes at least one oily antifoam active substance, that is to say, a hydrophobic material at least partially liquid at a temperature within the range of 5° to 90° C., a range corresponding to the normal range of wash temperatures encountered. The invention is especially applicable to antifoam active substances capable of controlling the foam production of a detergent powder product when used under relatively low temperature wash conditions, for example 5° to 50° C., sometimes referred to as low-temperature-sensitive antifoam active substances, although they can of course also function in this way at higher wash temperatures. Such antifoam active materials are at least partially liquid at these low wash temperatures, and are therefore likely to be at least partially liquid at storage (ambient) temperatures, thus posing particular problems of storage stability.

Preferred examples of oily antifoam active substances include:

(i) Silicone oils

These are polysiloxanes having the structure:

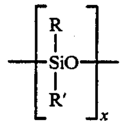

where R and R' are the same or different alkyl or aryl groups having from 1 to 6 carbon atoms; and x is an integer of at least 20.

The preferred polysiloxanes are polydimethylsiloxanes, where both R and R' are methyl groups.

The polysiloxanes usually have a molecular weight of from 500 to 200,000 and a kinematic viscosity of from 50 to $2\times10^6 mm^2sec^{-1}$. Preferably, the polysiloxanes have a kinematic viscosity of from $5\times10^2$ to $5\times10^4 mm^2sec^{-1}$, most preferably from $3\times10^3$ to $3\times10^4 mm^2sec^{-1}$ at 25° C. The polysiloxane is generally end blocked with trimethylsilyl groups, but other end-blocking groups are also suitable.

Examples of suitable commercially available polysiloxanes are the polydimethyl siloxanes, "Silicone 200 Fluids", available from Dow Corning, having viscosities of from 50 to $5\times10^4 mm^2sec^{-1}$.

Other examples of silicone oils include silicone oils 47v 100, 47v 5000 and 47v 12500 available from Rhone Poulenc; Silcolapse 430 and Silicone EP 6508 available from ICI; Rhodosil 454 available from Rhone Poulenc; and Silkonöl AK 100 available from Wacker.

(ii) Liquid hydrocarbons such as hydrocarbons usually having a melting point of from −40° C. to 5° C. and usually containing from 12 to 40 carbon atoms in the molecule. The normally liquid hydrocarbon will usually have a minimum boiling point of not less than 110° C. Liquid paraffins, preferably of the naphthenic or paraffinic type, also known as mineral white oil, are preferred. Particularly suitable are those chosen from mineral oils such as spindle oil (Velocite (Trade Mark) 6 ex Mobil), paraffin oil and other liquid oils such as those in the WTO to 5 series as available from British Petroleum.

Liquid hydrocarbons of animal and vegetable origin may also be used. Examples of these include vegetable oils such as sesame oil, cotton seed oil, corn oil, sweet almond oil, olive oil, wheat germ oil, rice bran oil, or peanut oil, or animal oils such as lanolin, neat's foot oil, bone oil, sperm oil or cod liver oil. Any such oils used preferably should not be highly coloured, of strong odour or otherwise unacceptable for use in a detergent composition.

(iii) Mixtures of liquid and solid hydrocarbons

A preferred antifoam active substance effective at low temperatures is petroleum jelly, a complex mixture of hydrocarbons having an overall melting range of about 30°-40° C.

Of these three types of oily antifoam active substances, silicone oils are especially preferred for use in the antifoam ingredient of the invention.

The action of the oily antifoam active substance may if desired be assisted by means of an antifoam promoter, that is to say, a finely divided water-insoluble hydrophobic particulate solid or a precursor which under wash conditions is converted to such a solid. Examples of antifoam promoters include the following:

(i) Hydrophobic silica

Finely divided particulate silica that has been rendered hydrophobic by chemical treatment is a highly preferred antifoam promoter. Any type of silica can be employed in the preparation of hydrophobic silica. Preferred examples are precipitated silica and pyrogenic silica which can be converted to a hydrophobic form by treatment, for example with chloroalkylsilanes, especially dimethyldichlorosilane, or by treatment, for example, with an alcohol, especially octanol. Other suitable agents can be employed in the preparation of hydrophobic silica.

The hydrophobic silica should preferably have a surface area of $>50 m^2 g^{-1}$ and a particle size of $<10$ μm, preferably $<3$ μm.

Examples of commercially available hydrophobic silicas include Sipernat (Trade Mark) D 10 and D 17 available from Degussa, Wacker HDK P 100/M, available from Wacker Chemicals and Cabosil (Trade Mark) N 70 TS available from Cabot Corp.

(ii) Alkyl phosphoric acids and salts thereof

Alkyl phosphoric acids or salts thereof which can be employed as antifoam promoter precursors are derived from acids having the structure I :

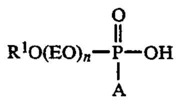
(I)

where A is —OH or $R^2O(EO)_m$—, $R^1$ and $R^2$ are the same or different, $C_{12}$-$C_{24}$, preferably $C_{16}$-$C_{22}$, straight or branched chain, saturated or unsaturated alkyl groups, especially $C_{16}$-$C_{18}$ linear saturated groups, and m and n are the same or different and are 0 or an integer of from 1 to 6. Preferably A is —OH and n is 0, so that the compound is a monoalkyl phosphoric acid, preferably with a linear alkyl group. If any ethylene oxide (EO) groups are present in the alkyl phosphoric acid, they should not be too long in relation to the alkyl chain length to make their respective calcium or magnesium salts soluble in water during use.

In practice, the alkyl phosphoric acid or salt is usually a mixture of both mono- and di-alkylphosphoric acid residues, with a range of alkyl chain lengths. Predominantly monoalkyl phosphates are usually made by phosphorylation of alcohols or ethoxylated alcohols, when n or m is an integer of from 1 to 6, using a polyphosphoric acid. Phosphorylation may alternatively be accomplished using phosphorus pentoxide, in which case the mixed mono- and di-alkyl phosphates are produced. Under optimum reaction conditions, only small quantities of unreacted materials or by-products are produced, and the reaction products advantageously can be used directly in the antifoam ingredient.

The substituted phosphoric acids of structure (I) above are used as stated in acid or salt form, that is either as the partial salt, or preferably as the full salt. When the antifoam ingredient comprising an alkyl phosphoric acid is added to the detergent composition, it will normally be neutralised by the more basic ingredients of the composition, to form usually the sodium salt, when the detergent composition is dispersed in water. When using the composition in hard water, the insoluble calcium and/or magnesium salt can then be formed, but in soft water some of the alkyl phosphate can remain as the alkali metal, usually sodium, salt. In this case, the addition of calcium and/or magnesium ions in the form of a water-soluble salt thereof is necessary to form the particulate, insoluble corresponding salts of the alkyl phosphate. If the alkyl phosphate is employed as the alkali metal or ammonium salt form, then again the calcium and/or magnesium salt is formed on use in hard water.

It is also possible to use a preformed insoluble alkyl phosphoric acid salt, with a polyvalent cation which is preferably calcium, although aluminium, barium, zinc, magnesium or strontium salts may alternatively be used. Mixtures of the insoluble alkyl phosphoric acid salts with the free acid or other soluble salts, such as alkali metal salts, can also be used if desired. The preferred insoluble alkyl phosphoric acid salts need not be totally water-insoluble, but they should be sufficiently insoluble that undissolved solid salt is present in the wash liquor, when the antifoam ingredient forms part of a detergent product employed in the laundering of fabrics.

(iii) Nitrogen compounds (bis-amides)

The antifoam promoter can also comprise a nitrogen-containing compound, free from phosphorus, having one of the structures:

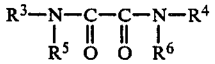
(II)

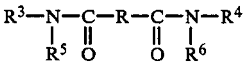
(III)

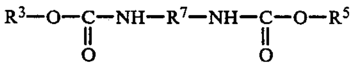
(IV)

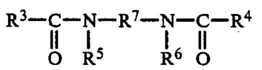
(V)

where $R^3$ and $R^4$ are the same or different $C_5$ to $C_{25}$ aliphatic groups, $R^5$ to $R^6$ are hydrogen, or the same or different $C_1$ to $C_{22}$ aliphatic groups; and $R^7$ is a $C_1$ to $C_9$ aliphatic group.

The preferred nitrogen compounds are those having the structure (V), for example, those where $R^3$ and $R^4$ are the same or different $C_{14}$ to $C_{22}$ aliphatic groups.

The most preferred nitrogen compounds are alpha, omega-dialkylamide alkanes, especially alpha, omegadistearylamide methane or ethane (also known as methylene and ethylene distearamides) having the structure:

$$C_{17}H_{35}-\underset{\underset{O}{\|}}{C}-NH-(CH_2)_n-NH-\underset{\underset{O}{\|}}{C}-C_{17}H_{35} \qquad (VI)$$

where n is the integer 1 or 2.

The nitrogen compound antifoam actives are particularly suitable for use in detergent compositions which, for environmental reasons, contain little or no phosphorus-containing compounds.

Especially preferred combinations of antifoam active substances (oily) and antifoam promoters (particulate) or precursors thereof are the following:

(a) the active, silicone together with the promoter, hydrophobic silica, commercially available examples of which are DB 100 available from Dow Corning, VP 1132 available from Wacker and Silcolapse (Trade Mark) 430 available from ICI;

(b) the active, hydrocarbon together with the promoter alkyl phosphoric acid salt, an example of which is petroleum jelly and stearyl phosphate (e.g. Alf (Trade Mark) 5 available from Diamond Shamrock); the preferred weight ratio of hydrocarbon to stearyl phosphate is 90:10, most preferably 60:40;

When such mixtures are used, the antifoam active substance (oily) preferably constitutes from 1 to 99% by weight, more preferably from 10 to 90% by weight, of the combination of antifoam active substance and antifoam promoter.

Mean Particle Diameter

The particles or granules of the antifoam ingredient will normally and preferably have a mean particle diameter of up to 2000 μm. More preferably the mean particle diameter will be from 100 to 2000 μm, ideally from 200 to 1000 μm.

It is to be understood that the antifoam particles or granules as herein defined in terms of their mean diameter may be discrete particles, also known as primary particles, or agglomerated groups of particles, also known as secondary particles or agglomerates, or mixtures of the two.

PROCESSES FOR MANUFACTURE OF ANTIFOAM INGREDIENT

A further aspect of the invention provides processes for manufacturing particles of the antifoam ingredient according to the invention, which are then suitable for use in detergent powder products.

A first process according to the invention comprises the steps of:

(i) adding the antifoam active material to the powdered hydrophilic starch with mixing to form a homogeneous mixture;

(ii) adding water to the mixture at a rate of from 0.3 to 15 parts by weight per minute to every 100 parts by weight of the hydrophilic starch in the mixture, with further mixing whereby controlled hydration of the gelatinised hydrophilic starch is effected.

It is apparent that water should be added gradually, preferably by spraying, to the mixture of starch and antifoam active substance, in order to ensure that controlled hydration and swelling of the starch occur uniformly so as to optimise its protection of the antifoam active substance trapped with the particles.

The actual rate of addition will depend upon the particle size of the water droplets, the water temperature, the rate of mixing of the starch and the antifoam active material, and the rate at which the starch is able to take up water to assume a hard, gelatinous, hydrated form.

In view of these variable factors, it is not possible to provide an absolute value for the rate at which water should be added to the starch, but, by way of example, it is apparent that a rate of addition of water of from about 1 to 10 parts by weight of water per minute to every 100 parts by weight, preferably about 5 parts water per 100 parts, of gelatinised starch, is adequate.

According to a preferred embodiment of the first process for manufacturing the antifoam ingredient of the invention, the following process steps are employed:

(a) a pan granulator is loaded with the gelatinised hydrophilic starch in a finely divided dry state;

(b) the antifoam active material (oil optionally plus solids) is sprayed onto the starch with mixing in the granulator to form slightly sticky particles of starch carrying the antifoam active material;

(c) water is then sprayed onto the slightly sticky particles at a rate of about 5 parts by weight water per minute for every 100 parts by weight of starch in order partially to hydrate the gelatinised starch, to form hardened, gelatinous, bead-like particles of the finished antifoam ingredient.

A second process according to the invention comprises step (i) as in the first process, and (ii) contacting the mixture with water vapour at a relative humidity of at least 10%, preferably at least 70% and advantageously at least 90%, whereby controlled hydration of the gelatinised hydrophilic starch is effected.

The second process may be advantageously carried out by fluidising the mixture on a fluid bed using moist air. The amount of hydration may be controlled and monitored by measuring the moisture content of the air at the inlet and outlet of the fluidised bed.

Alternatively, the mixture may be tumbled in a horizontal fixed drum fitted with baffles, and a stream of moist air passed through the drum. Again the moisture content of the air at the inlet and outlet can be monitored to give an estimate of water uptake.

The higher the relative humidity of the moist air used, the quicker the hydration step will be effected. Air with a relative humidity of at least 90% is preferably employed.

Particles having the preferred mean particle diameter of up to 2000 μm, made by either process, can be selected by classifying, for example by sieving, the antifoam particles, or the core particles onto which the antifoam active agent is sprayed or otherwise applied.

DETERGENT COMPOSITIONS

The antifoam ingredient according to the invention is particularly suitable for incorporation in a detergent powder composition, in which case, as indicated previously, such a composition may comprise from 0.1 to 5%, preferably from 0.5 to 3% by weight, of the antifoam ingredient as a whole. Advantageously the detergent composition comprises from 0.5 to 2% by weight, preferably about 1% by weight, of the antifoam active material itself.

Detergent active compounds

A detergent composition which is particularly suited to the incorporation of an antifoam ingredient according to the invention will generally comprise one or more detergent active compounds which can be chosen from soap and non-soap anionic, cationic, nonionic, amphoteric or zwitterionic detergent active compounds, and mixtures thereof. Many suitable detergent-active compounds are commercially available and are fully described in the literature, for example in "Surface Active Agents and Detergents", Volumes I and II, by Schwartz, Perry and Berch.

The preferred detergent-active compounds which can be used are soaps and synthetic non-soap anionic and nonionic compounds.

Soap is a water-soluble or water-dispersible alkali metal salt of an organic acid, and the preferred soaps are sodium or potassium salts, or the corresponding ammonium or substituted ammonium salts of an organic acid. Examples of suitable organic acids are natural or synthetic aliphatic carboxylic acids of from 10 to 22 carbon atoms, especially the fatty acids of triglyceride oils such as tallow, coconut oil and rape seed oil.

The soap which is most preferred is a soap derived from rape seed oil. When soap derived from tallow fatty acids is chosen, then fatty acids derived from tallow class fats, for example beef tallow, mutton tallow, lard, palm oil and some vegetable butters can be selected. Minor amounts of up to about 30%, preferably 10 to 20%, by weight of sodium soaps of nut oil fatty acids derived from nut oils, for example coconut oil and palm kernel oil, may be admixed with the sodium tallow soaps, to improve their lathering and solubility characteristics if desired. Whereas tallow fatty acids are predominantly $C_{14}$ and $C_{18}$ fatty acids, the nut oil fatty acids are of shorter chain length and are predominantly $C_{10}$–$C_{14}$ fatty acids.

Synthetic anionic non-soap detergent active compounds are usually water-soluble alkali metal salts of organic sulphates and sulphonates having alkyl radicals containing from about 8 to about 22 carbon atoms, the term alkyl being used to include the alkyl portion of higher aryl radicals.

Preferred examples of suitable anionic detergent compounds are sodium and potassium alkyl sulphates, especially those obtained by sulphating higher ($C_8$–$C_{18}$) alcohols produced for example from tallow or coconut oil; sodium, potassium and ammonium alkyl benzene sulphonates, particularly linear alkyl benzene sulphonates having from 10 to 16, especially from 11 to 13 carbon atoms in the alkyl chain; sodium alkyl glyceryl ether sulphates, especially those ethers of the higher alcohols derived from tallow or coconut oil and synthetic alcohols derived from petroleum; sodium coconut oil fatty acid monoglyceride sulphates and sulphonates; sodium and potassium salts of sulphuric acid esters of higher ($C_9$–$C_{18}$) fatty alcohol-alkylene oxide, particularly ethylene oxide, reaction products; the reaction products of fatty acids such as coconut fatty acids esterified with isethionic acid and neutralised with sodium hydroxide; sodium and potassium salts of fatty acid amides of methyl taurine; alkane monosulphonates such as those derived by reacting alpha-olefins ($C_8$–$C_{20}$) with sodium bisulphite and those derived by reacting paraffins with $SO_2$ and $Cl_2$ and then hydrolysing with a base to produce a random sulphonate; olefin sulphonates, which term is used to describe the material made by reacting olefins, particularl $C_{10}$–$C_{20}$ alpha-olefins, with $SO_3$ then neutralising and hydrolysing the reaction product; or mixtures thereof. The preferred anionic detergent compounds are sodium ($C_{11}$–$C_{15}$) alkyl benzene sulphonates and sodium ($C_{16}$–$C_{18}$) alkyl sulphates.

Examples of suitable nonionic detergent compounds which may be used include the reaction products of alkylene oxides, usually ethylene oxide, with alkyl ($C_6$–$C_{22}$) phenols, generally 2 to 25 EO, i.e. 2 to 25 units of ethylene oxide per molecule; the condensation products of aliphatic ($C_8$–$C_{25}$) primary or secondary linear or branched alcohols with ethylene oxide, generally 3 to 30 EO, and products made by condensation of ethylene oxide with the reaction products of propylene oxide and ethylenediamine. Other so-called nonionic detergent compounds include long-chain tertiary amine oxides, long-chain tertiary phosphine oxides and dialkyl sulphoxides.

Mixtures of detergent-active compounds, for example mixed anionic or mixed anionic and nonionic compounds, are preferably used in the detergent compositions.

Cationic, amphoteric or zwitterionic detergent-active compounds optionally can also be used in the detergent compositions, but this is not normally desired owing to their relatively high cost. If any cationic, amphoteric or zwitterionic detergent-active compounds are used, it is generally in small amounts in products based on the much more commonly used synthetic anion and/or nonionic detergent-active compounds.

The detergent active component of the detergent powder composition will generally comprise from 5 to 40%, preferably from 8 to 30% by weight of the composition.

Other detergent adjuncts

Detergent compositions containing the antifoam ingredient of the invention can also contain other ingredients (adjuncts), which can include, bleaching materials, detergency builders as well as other adjuncts commonly employed in detergent products.

Bleaching materials

Bleaching materials include peroxy bleach compounds, such as an inorganic persalt. Preferably, peroxy bleach compounds are employed together with an activator therefor.

The inorganic persalt acts to release active oxygen in solution, and the activator therefor is usually an organic compound having one or more reactive acyl residues, which cause the formation of peracids, the latter providing a more effective bleaching action at a low temperature, that is, in the range from 20° to 60° C., than is possible with the inorganic persalt itself.

The ratio by weight of the peroxy bleach compound to the activator in the detergent composition may vary from 30:1 to about 1:1, preferably from 15:1 to 2:1.

Typical examples of suitable peroxy bleach compounds are inorganic persalts such as alkali metal perborates, both tetrahydrates and monohydrates, alkali metal percarbonates, persilicates and perphosphates and mixtures thereof. Sodium perborate is the preferred inorganic persalt, particularly sodium perborate monohydrate and sodium perborate tetrahydrate.

Activators for peroxy bleach compounds include:

(a) N-diacylated and N,N'-polyacylated amines, for example N,N,N'N'-tetraacetyl methylenediamine and N,N,N'N'-tetraacetyl ethylenediamine, N,N-diacetylaniline, N,N-diacetyl-p-toluidine; 1,3-diacylated hydantoins such as, for example, 1,3-diacetyl-5,5-dimethyl hydantoin and 1,3-dipropionyl hydantoin; alpha-acetoxy-(N,N')-polyacylmalonamide, for example alpha-acetoxy-(N,N')-diacetylmalonamide;

(b) N-alkyl-N-sulphonyl carbonamides, for example the compounds N-methyl-N-mesyl-acetamide, N-methyl-N-mesyl-benzamide, N-methyl-N-mesyl-p-nitrobenzamide and N-methyl-N-mesyl-p-methoxybenzamide;

(c) N-acylated cyclic hydrazides, acylated triazones or urazoles, for example monoacetylmaleic acid hydrazide;

(d) O,N,N-trisubstituted hydroxylamines, for example O-benzoyl-N,N-succinyl hydroxylamine, O-acetyl-N,N-succinyl hydroxylamine, O-p-methoxybenzoyl-N,N-succinyl hydroxylamine, O-p-nitrobenzoyl-N,N-succinyl hydroxylamine and O,N,N-triacetyl hyroxylamine;

(e) N,N'-diacyl-sulphurylamides, for example N,N'-dimethyl-N,N'-diacetyl sulphurylamide and N,N'-diethyl-N,N'-dipropionyl sulphurylamide;

(f) Triacylcyanurates, for example triacetyl cyanurate and tribenzoyl cyanurate;

(g) Carboxylic acid anhydrides, for example benzoic anhydride, m-chloro-benzoic anhydride, phthalic anhydride and 4-chloro-phthalic anhydride.

(h) Sugar esters, for example glucose pentaacetate;

(i) Esters of sodium p-phenol sulphonate, for example sodium acetoxybenzene sulphonate, sodium benzoyloxybenzene sulphonate, and high acyl derivatives, for example linear and branched octanoyl and nonanoyl phenol sulphonic acid salts.

(j) 1,3-diacyl-4,5-diacyloxy-imidazoline, for example 1,3-diformyl-4,5-diacetoxy-imidazolidine, 1,3-diacetyl-4,5-diacetoxy-imidazoline, 1,3-diacetyl-4,5-dipropionyloxy-imidazoline;

(k) N,N'-polyacylated glycoluril, for example N,N,N'N'-tetraacetyl glycoluril and N,N,N'N'-tetrapropionylglycoluril;

(l) Diacylated-2,5-diketopiperazine, for example 1,4-diacetyl-2,5-diketopiperazine, 1,4-dipropionyl-2,5-diketopiperazine and 1,4-dipropionyl-3,6-dimethyl-2,5-diketopiperazine;

(m) Acylation products of propylenediurea or 2,2-dimethyl-propylenediurea (2,4,6,8-tetraazabicyclo-(3,3,1)-nonane-3,7-dione or its 9,9-dimethyl derivative), especially the tetraacetyl- or the tetrapropionyl-propylenediurea or their dimethyl derivatives;

(n) Carbonic acid esters, for example the sodium salts of p-(ethoxycarbonyloxy)-benzoic acid and p-(propoxy-carbonyloxy)-benzene sulphonic acid.

The N-diacetylated and N,N'-polyacylated amines mentioned under (a) are of special interest, particularly N,N,N'N'-tetraacetyl ethylenediamine (TAED).

Mixtures of one or more of the forgoing activators can be employed in bleaching detergent compositions of the invention.

It is preferred to use the activator in granular form, especially when it is present in a finely divided form.

Specifically, it is preferred to employ an activator having an average particle size of less than 150 micrometers (μm), which gives significant improvement in bleach efficiency. The sedimentation losses, when using an activator with an average particle size of less than 150 μm, are substantially decreased. Even better bleach performance is obtained if the average particle size of the activator is less than 100 μm. However, too small a particle size gives increased decomposition, dust formation and handling problems, and although particle sizes below 100 μm can provide an improved bleaching efficiency, it is desirable that the activator should not have more than 20% by weight of particles with a size of less than 50 μm. On the other hand, the activator may have a certain amount of particles of a size greater than 150 μm, but it should not contain more than 5% by weight of particles >300 μm, and not more than 20% by weight of particles >150 μm. If needle-shaped crystalline activator particles are used, these sizes refer to the needle diameter. It is to be understood that these particle sizes refer to the activator present in the granules, and not to the granules themselves. The latter generally have on average a particle size of from 100 to 2000 μm, preferably 250 to 1000 μm. Up to 5% by weight of granules with a particle size of >1600 μm and up to 10% by weight of granules <250 μm is tolerable. The granules incorporating the activator, preferably in this finely divided form, may be obtained by granulating the activator with a suitable carrier material, such as sodium tripolyphosphate and/or potassium tripolyphosphate. Other granulation methods, for example using organic and/or inorganic granulation aids, can also usefully be applied. The granules can be subsequently dried, if required. Generally, any granulation process is applicable, so long as the granule contains the activator, and so long as the other materials present in the granule do not inhibit the activator.

The bleaching material component when present will generally comprise from 1 to 30%, preferably from 5 to 20% by weight of the detergent composition.

Detergency builders

Builders include soaps, inorganic and organic water-soluble builder salts, as well as various water-insoluble and so-called "seeded" builders, who function is to soften hard water by solubilisation or by removal by other means (e.g. by sequestration or by precipitation) of calcium and to a lesser extent magnesium salts responsible for water hardness, thereby improving detergency.

Soaps which can function as detergency builders are those as defined hereinbefore as capable of functioning also as detergent active compounds.

Inorganic detergency builders include, for example, water-soluble salts of phosphates, pyrophosphates, orthophosphates, polyphosphates, phosphonates, and polyphosphonates. Specific examples of inorganic phosphate builders include sodium and potassium tripolyphosphates, phosphate and hexametaphosphates. The polyphosphonates can specifically include, for example, the sodium and potassium salts of ethylene disphosphonic acid, the sodium and potassium salts of ethane 1-hydroxy-1,1-diphosphonic acid, and the sodium and potassium salts of ethane-1,1,2-triphosphonic acid. Sodium tripolyphosphate is an especially preferred, water-soluble inorganic builder.

Non-phosphorus-containing inorganic water-soluble sequestrants can also be selected for use as detergency builders. Specific examples of such non-phosphorus, inorganic builders include borate, silicate and aluminate salts. The alkali metal, especially sodium or potassium, salts are particularly preferred.

Organic non-phosphorus-containing, water-soluble detergency builders include, for example, the alkali metal, ammonium and substituted ammonium polyacetates, carboxylates, polycarboxylates, succinates, oxalates and polyhydroxysulphonates. Specific examples of the polyacetate and polycarboxylate builder salts include sodium, potassium, lithium, ammonium and substituted ammonium salts of ethylenediamine tetraacetic acid, nitrilotriacetic acid, oxydisuccinic acid, mellitic acid, benzene polycarboxylic acids, citric acid, carboxymethyoxysuccinic acid, carboxymethyoxymalonic acid and mixtures thereof.

Highly preferred organic water-soluble non-phosphorous-containing builders include sodium silicate, sodium citrate, sodium oxydisuccinate, sodium mellitate, sodium nitrilotriacetate, and sodium ethylenediaminetetraacetate.

Another type of detergency builder material useful in the compositions and products of the invention comprise a water-soluble material capable of forming a water-insoluble reaction product with water hardness cations, such as alkali metal or ammonium salts of carbonate, bicarbonate and sesquicarbonate optionally in combination with a crystallisation seed which is capable of providing growth sites for said reaction product.

Other types of builder that can be used include various substantially water-insoluble materials which are capable of reducing the hardness content of laundering liquors by an ion-exchange process.

Examples of such ion-exchange materials are the complex aluminosilicates, i.e. zeolite-type materials, which are useful presoaking or washing adjuncts which soften water by removal of calcium ion. Both the naturally occurring and synthetic "zeolites", especially Zeolite A and hydrated Zeolite A materials, are useful as builders.

The detergency builder component when present will generally comprise from about 1% to 90%, preferably from about 5% to 75% by weight of the detergent composition.

Other detergent adjuncts

Further detergent adjuncts which can optionally be employed in the detergent compositions of the invention include superfatting agents, such as free long-chain fatty acids, lather boosters such as alkanolamides, particularly the monoethanolamides derived from palmkernel fatty acids and coconut fatty acids; anti-redeposition agents such as sodium carboxymethyl-cellulose, polyvinyl pyrrolidone and the cellulose ethers such as methyl cellulose and ethyl hydroxyethyl cellulose; bleach stabilisers such as ethylenediamine tetramethylene phosphonate and diethylenetriamine pentamethylene phosphonate; fabric-softening agents; inorganic salts such as sodium and magnesium sulphate; and - usually present in very minor amounts - optical brighteners, fluorescers, enzymes such as proteases and amylases, anti-caking agents, thickeners, germicides and colourants.

Various detergency enzymes well-known in the art for their ability to degrade and aid in the removal of various soils and stains can also optionally be employed in the compositions according to this invention. Detergency enzymes are commonly used at concentrations of from about 0.1% to about 1.0% by weight of such compositions. Typical enzymes include the various proteases, lipases, amylases, and mixtures thereof, which are designed to remove a variety of soils and stains from fabrics.

It is also desirable to include one or more antideposition agents in the compositions of the invention, to decrease a tendency to form inorganic deposits on washed fabrics. The amount of any such antideposition agent when employed is normally from 0.1% to 5% by weight, preferably from 0.2% to 2.5% by weight of the composition. The preferred antideposition agents are anionic polyelectrolytes, especially polymeric aliphatic carboxylates, or organic phosphonates.

It may also be desirable to include in the detergent compositions an amount of an alkali metal silicate, particularly sodium ortho-, meta- or preferably neutral or alkaline silicate. The presence of such alkali metal silicates at levels of at least 1%, and preferably from 5% to 15% by weight of the product, is advantageous in decreasing the corrosion of metal parts in washing machines, besides providing some measure of building and giving processing benefits and generally improved powder properties. The more highly alkaline ortho- and meta-silicates would normally only be used at lower amounts within this range, in admixture with the neutral or alkaline silicates.

The detergent compositions of the invention are usually required to be alkaline, but not too strongly alkaline as this could result in fabric damage and also be hazardous for domestic use. In practice the compositions should preferably provide a pH of from about 8.5 to about 11 in use in the aqueous wash liquor. It is preferred in particular for domestic products to yield a pH of from about 9.0 to about 10.5, as lower pH values tend to be less effective for optimum detergency, and more highly alkaline products can be hazardous if misused. The pH is measured at the lowest normal usage concentration of 0.1% w/v of the product in water of 12° H (Ca) (French permanent hardness, calcium only) at 50° C. so that a satisfactory degree of alkalinity can be assured in use at all normal product concentrations.

The total amount of detergent adjuncts that can be incorporated into the detergent compositions according to the invention will normally form the balance of the product after accounting for the antifoam ingredient and the detergent-active compound. The detergent adjuncts will accordingly form from 0 to 94.9% by weight of the product.

Use of Detergent Composition

The detergent composition can be employed in a normal domestic or other laundry process conveniently employing a washing machine. It is intended that the product is effective both in removing soil from fabrics being washed, and in conferring other attributes such as bleaching, perfuming and fabric softening.

For most purposes, the detergent composition can be employed at a concentration of 0.05 to 5% by weight of the wash liquor. Preferably, the concentration in the wash is from 0.2 to 2%, most preferably from 0.3 to 1% by weight of the wash liquor.

Evidence to define the amount of water to be incorporated in the antifoam ingredient for optimum storage stability As has been stated earlier, the core of the antifoam particles will comprise gelatinised and/or chemically modified starch in a swollen, hydrated state, such that it remains superficially dry and non-sticky, yet which contains sufficient water to yield a gelatinous structure encapsulating antifoam active substance(s) within. It is important to ensure that the amount of water present in the antifoam ingredient is adequate for this purpose, and to this end, experimental evidence is given below to substantiate this aspect of the invention.

Materials:

| | |
|---|---|
| Gelatinised starch | Amijel 12014 ex CPC |
| antifoam active substance (silicone/hydrophilic silica) | DB100 ex Dow Corning |
| Water | demineralised |

Antifoam ingredient preparation:

For laboratory scale preparation of the antifoam ingredient, a Kenwood (Trade Mark) food mixer was used. Silicone antifoam was slowly added to continuously stirred (on speed 3) starch in the bowl of the mixer to give an antifoam to starch weight ratio of 40/60. At this stage the mixture was very cohesive. As water was sprayed in a fine mist onto the stirred mixture, however, particles were produced which became harder, more bead-like in appearance and more free flowing. Antifoam ingredients were prepared containing from zero to almost 30% by weight of water. Their compositions were calculated from the weight of water sprayed on, and are given in Table I below:

TABLE I

| Calculated compositions of antifoam ingredients | | | |
|---|---|---|---|
| | Weight % in antifoam ingredient | | |
| Number | DB100 | STARCH | WATER |
| 1 | 40 | 60 | — |
| 2 | 37.74 | 56.60 | 5.66 |
| 3 | 32.80 | 49.30 | 17.90 |
| 4 | 28.57 | 42.86 | 28.57 |

Foam evaluation

Initial (freshly dosed) wash performance of a detergent powder product containing each antifoam ingredient, and performance after up to 3 months storage of the product in sealed bottles at 37° C., were compared using machines made to high tolerances (Miele 756). Clean 2.5 kg loads consisting of 12 m of cotton sheet and 3 m terry towelling (in 1 m squares) were washed in a main wash programme with water temperature rising from ambient to 90° C.

A detergent powder was used at 100 g dosage. Each of the antifoam ingredients had been added to the powder at a level of 1% by weight antifoam. Foam height was measured at regular intervals throughout each wash from an arbitrarily defined scale on the machine porthole. All washes were performed in duplicate, an average value being taken.

The detergent powder had the following formulation:

| | Weight % |
|---|---|
| Sodium dodecyl benzene sulphate | 9 |
| $C_{13-15}$ fatty alcohol ethoxylate | 4 |
| Sodium tripolyphosphate | 32 |
| Alkaline sodium silicate | 6 |
| Sodium carboxymethylcellulose | 0.5 |
| EDTA | 0.15 |
| Sodium sulphate | 2 |
| Sodium carbonate | 5 |
| Sodium sulphate | 10 |
| Sodium perborate tetrahydrate | 20 |
| Antifoam ingredient | 1 |
| Water | 10.35 |

Results

In the absence of hydration, mixing the silicone/hydrophobic silica antifoam DB100 with starch at a ratio of 40:60 resulted in a tacky, cohesive product with poor flow properties. With increasing levels of water however, the antifoam ingredient became harder and more granular, granule size increasing with water content. Consequently, the flow properties improved. With about 30% by weight of water, the particles were of the order of several millimetres in diameter and were wet and translucent in appearance. Antifoam ingredients containing such a high level of water became discoloured, presumably as a result of microbial attack, when stored for up to one month.

Foam control using detergent powder product freshly dosed with antifoam adjunct

Up to a spray-on level of about 20% by weight of water, all of the adjuncts gave similar foam control initially, as Table 2 shows. This is also similar to foam control imparted by antifoam active substance added directly to the powder. The results show no foam at all for most of the wash but rising slightly, to about a quarter of a porthole, by the end of the wash. A higher level of water (about 30%) apparently causes such efficient encapsulation of the antifoam that it is not released until about 15 minutes into the wash, resulting in a full porthole of foam for the first 15 minutes. This then subsides to give virtually no foam for the rest of the wash.

TABLE 2

| Initial foam profiles | | | | | |
|---|---|---|---|---|---|
| | Foam heights/arbitrary units* | | | | |
| Wash time/ minutes | Antifoam added directly to detergent powder | Water content of adjunct | | | |
| | | 5.7% | 8.5% | 17.9% | 28.6% |
| 1 | 0 | 0 | 0 | 1.0 | 7.0 |
| 2 | 0 | 0 | 0 | 0.5 | 9.0 |
| 3 | 0 | 0 | 0 | 0.5 | 10.0 |
| 4 | 0 | 0 | 0 | 0.5 | 10.0 |
| 5 | 0 | 0 | 0 | 0 | 10.0 |
| 6 | 0 | 0 | 0 | 0 | 10.0 |
| 7 | 0 | 0 | 0 | 0 | 10.0 |
| 10 | 0 | 0 | 0 | 0 | 10.0 |
| 15 | 0 | 0 | 1.5 | 0 | 5.0 |
| 20 | 0 | 0 | 1.5 | 0 | 0 |
| 25 | 0 | 0 | 1.0 | 0 | 0 |
| 30 | 1.5 | 0 | 1.0 | 0 | 0 |
| 35 | 1.5 | 0 | 2.0 | 0 | 0 |
| 40 | 1.5 | 0 | 2.0 | 0 | 0 |
| 45 | 1.5 | 0.5 | 1.5 | 0 | 0.25 |
| 50 | 2.0 | 0.5 | 1.5 | 0.5 | 0.5 |
| 55 | 3.0 | 1.5 | 1.5 | 1.3 | 1.0 |
| 60 | 3.0 | 1.5 | 1.5 | 1.8 | 1.0 |

*10 corresponds to full porthole

Foam control after storage for 3 months at 37° C.

Antifoam ingredients containing more than 20% by weight of water were not included in extended storage tests because of their poor initial performance and because of their poor resistance to microbial attack.

Foam profiles obtained from the remaining antifoam ingredients stored for 3 months at 37° C. in the detergent powder products are presented in Table 3. It was immediately apparent that silicone/hydrophobic silica antifoam added directly to the powder deactivated rapidly on storage. Without the hydration step, agglomeration with starch did little to improve storage stability. Pre-hydrating the antifoam ingredient before incorporation into the detergent powder did, however, confer storage stability on the silicone. With increasing hydration levels from about 6% to about 18%, there was a corresponding drop in foam height at the end of the wash as Table 4 shows. There was no effect of hydration (within these limits) on foam control at the start of the wash.

TABLE 3

| Wash time/ minutes | Foam profiles after storage | | | |
|---|---|---|---|---|
| | Foam heights/arbitrary units Water content of adjunct/% | | | |
| | 0 | 5.7 | 8.5 | 17.9 |
| 1 | 0 | 0 | 0 | 0 |
| 2 | 0 | 0 | 0 | 0 |
| 3 | 0 | 0 | 0 | 0 |
| 4 | 1.0 | 0.5 | 0 | 0 |
| 5 | 2.0 | 0.7 | 0 | 0 |
| 6 | 3.0 | 1.0 | 0.5 | 0 |
| 7 | 3.0 | 2.0 | 1.0 | 0 |
| 10 | 5.0 | 2.0 | 4.0 | 1.0 |
| 15 | 8.0 | 3.0 | 4.0 | 1.2 |
| 20 | 9.0 | 4.0 | 5.0 | 1.5 |
| 25 | 9.5 | 4.0 | 5.0 | 2.0 |
| 30 | 8.0 | 5.0 | 4.0 | 2.5 |
| 35 | 8.5 | 5.0 | 5.0 | 2.5 |
| 40 | 6.0 | 5.0 | 4.0 | 2.5 |
| 45 | 6.0 | 5.0 | 4.0 | 2.5 |
| 50 | 6.0 | 5.5 | 3.5 | 2.5 |
| 55 | 6.5 | 5.5 | 3.0 | 3.0 |
| 60 | 8.0 | 5.0 | 4.0 | 3.0 |

*10 corresponds to full porthole

TABLE 4

| Foam heights at beginning and end of wash after storage | | |
|---|---|---|
| Water content of adjunct | Foam height after 1 minute/ arbitrary units | Foam height after 60 minutes/ arbitrary units |
| 0 | 0 | 8.0 |
| 5.7 | 0 | 5.0 |
| 8.5 | 0 | 4.0 |
| 17.9 | 0 | 3.0 |

CONCLUSION

Hydration limits

For silicone/starch/water systems, the useful limits of the pre-hydration process lie in the range from 5% to 20% by weight of the antifoam ingredient. Between these limits, performance after storage is more or less constant. Antifoam is delivered efficiently into the wash (there is no foam at the start of the wash) and storage stability of the antifoam is good. Less than 5% of water is inefficient in protecting the antifoam and more than about 20% by weight of water leads to poorer antifoam delivery into the wash.

EXAMPLES

The invention is illustrated by the following non-limiting Examples in which all parts and percentages are by weight.

Example 1

Antifoam granules suitable for incorporation into a detergent powder composition were produced in accordance with the following process:

(a) a mixture of silicone oil and hydrophobic silica (DB 100 ex Dow Corning) was sprayed onto finely divided gelatinised starch in a pan granulator in order to obtain partiles of solid but slightly sticky core material;

(b) the particles of core material were then sprayed with water at a temperature of 40° C., at a rate of 5 parts by weight of water per minute for every 100 parts by weight of the core material, partially to hydrate the gelatinised starch to form gelatinous beads. The antifoam granules had the following composition:

| | % |
|---|---|
| Gelatinised starch (Amijel 12014), dry weight | 50 |
| Silicone/hydrophobic silica antifoam active material (DB 100) | 40 |
| Water | 10 |
| | 100 |

Example 2

Antifoam granules were prepared by mixing gelatinised starch with stearyl phosphate (Alf 5) and petroleum jelly in a Schugi mixer. Water was sprayed on, at 40° C., at the same rate as in Example 1. The antifoam granules had the following composition:

| | % |
|---|---|
| Gelatinised starch as in Example 1 | 50 |
| Stearyl phosphate | 8 |
| Petroleum jelly | 32 |
| Water | 10 |
| | 100 |

Examples 3-6

Antifoam granules containing stearyl phosphate (Alf 5) and petroleum jelly were prepared by spraying a molten mixture of the stearyl phosphate and petroleum jelly onto the gelatinised starch used in Example 1, in the bowl of a Kenwood (Trade Mark) kitchen mixer. The resulting tacky granules were sprayed with a fine mist of water droplets, at the rates given below, whereby the tackiness was gradually reduced and free-flowing granules were obtained. The compositions of the granules were as follows:

| | % | | | |
|---|---|---|---|---|
| | 3 | 4 | 5 | 6 |
| Gelatinised starch as in Example 1 | 51 | 51 | 51 | 54 |
| Stearyl phosphate | 6.8 | 6.8 | 6.8 | 7.2 |
| Petroleum jelly | 27.2 | 27.2 | 27.2 | 28.8 |
| Water | 15 | 15 | 15 | 10 |
| | 100 | 100 | 100 | 100 |
| Water spray-on rate per 100 parts by weight of starch (parts per min.) | 1.4 | 2.7 | 10 | 1.4 |

In general, higher spray-on rates gave larger, more bead-like agglomerates.

The antifoam granules of Examples 3 and 6 were incorporated, at a level of 1% by weight, into a detergent powder as specified previously under "Foam Evaluation". Very little foam was observed in experiments similar to those described previously. After storage in sealed glass bottles at 37° C. for 3 months, there was no deterioration in foam control. The foam height results before and after storage are shown in Table 5.

TABLE 5

| | Examples 3 and 6 Foam Height/Arbitrary Units* | | | |
|---|---|---|---|---|
| | Example 3 | | Example 6 | |
| Wash time (mins) | Freshly dosed powder | Stored 3 months 37° C. | Freshly dosed powder | Stored 3 months 37° C. |
| 1 | 3.0 | 0.5 | 2.0 | 0.2 |
| 2 | 3.0 | 0.5 | 2.0 | 0.2 |
| 3 | 3.0 | 0.5 | 2.0 | 0.3 |
| 4 | 3.0 | 0.5 | 1.0 | 0.3 |
| 5 | 3.0 | 0.75 | 1.0 | 0.5 |
| 6 | 3.0 | 0.75 | 1.0 | 0.5 |
| 7 | 3.0 | 0.75 | 1.0 | 0.5 |
| 10 | 3.0 | 0.5 | 0.2 | 0.75 |
| 15 | 1.0 | 0.2 | 0.2 | 0.75 |
| 20 | 0.2 | 0.2 | 0.2 | 0.75 |
| 25 | 0.2 | 0.75 | 0.5 | 0.75 |
| 30 | 1.0 | 0.75 | 0.75 | 1.0 |
| 35 | 2.0 | 1.5 | 1.0 | 1.0 |
| 40 | 2.0 | 1.75 | 2.0 | 1.0 |
| 45 | 2.0 | 2.0 | 2.0 | 1.0 |
| 50 | 2.0 | 3.0 | 3.0 | 2.0 |
| 55 | 3.0 | 3.0 | 3.0 | 2.0 |
| 60 | 4.0 | 3.0 | 3.0 | 2.0 |

*10 corresponds to full porthole

Examples 7 and 8

Antifoam granules were prepared using a 0.5 m pan granulator as described in Example 1. The compositions and water spray-on rates were as follows:

| | % | |
|---|---|---|
| | 7 | 8 |
| Gelatinised starch as in Example 1 | 75 | 54 |
| Stearyl phosphate | 3 | — |
| Petroleum jelly | 17 | — |
| DB 100 | — | 36 |
| Water | 5 | 10 |
| | 100 | 100 |
| Water spray-on rate per 100 parts by weight of starch (parts per minute) | 10 | 1.85 |

The antifoam granules of Example 7 were incorporated, at a level of 1% by weight, in a detergent powder having the formulation given previously under "Foam Evaluation". Foam control results for the freshly dosed powder and for the powder after 3 months' storage at 37° C. are given in Table 6.

TABLE 6

| | Example 7 Foam Height/Arbitrary Units* | |
|---|---|---|
| Wash time (mins) | Freshly dosed powder | Stored 3 months 37° C. |
| 1 | 2.0 | 0.2 |
| 2 | 1.0 | 0.5 |
| 3 | 1.5 | 0.5 |
| 4 | 1.0 | 0.5 |
| 5 | 1.0 | 0.5 |
| 6 | 0.5 | 0.5 |
| 7 | 1.5 | 0.5 |
| 10 | 0.5 | 0.75 |
| 15 | 1.0 | 0.75 |
| 20 | 1.0 | 0.75 |
| 25 | 1.5 | 1.2 |
| 30 | 1.5 | 1.5 |
| 35 | 1.5 | 2.0 |
| 40 | 2.0 | 2.5 |
| 45 | 3.0 | 2.5 |
| 50 | 3.5 | 3.5 |
| 55 | 4.0 | 3.5 |
| 60 | 5.0 | 5.0 |

*10 corresponds to full porthole.

We claim:

1. A process for the production of a detergent powder composition, which process comprises:

(I) producing a particulate anti-foam ingredient by the steps of:

(a) adding an anti-foam active material comprising at least one hydrophobic anti-foam active substance which is at least partially liquid at a temperature within the range from 5° to 90° C., to pregelatinized partially hydrated water-swellable hydrophilic starch as a carrier material for said anti-foam active material, and mixing said anti-foam active material with said starch to form a homogeneous mixture;

(b) adding water to said mixture of anti-foam active material and starch whereby hydration of said starch is effected, the amounts of said starch, anti-foam active material and added water being such that the anti-foam ingredient comprises (i) from 30 to 90% by weight of said starch, (ii) from 5 to 50% by weight of said anti-foam active material, and (iii) from 5 to 30% by weight of said added water;

(II) thereafter incorporating the resulting anti-foam ingredient into a detergent powder composition containing detergent active and detergency builder.

2. A process as claimed in claim 1 wherein the anti-foam ingredient comprises (i) from 45 to 75% by weight of said starch, (ii) from 20 to 40% by weight of said anti-foam active material, and (iii) from 5 to 20% by weight of said added water.

3. A process as claimed in claim 1 wherein the anti-foam ingredient comprises (i) from 49 to 75% by weight of said starch, (ii) from 20 to 40% by weight of said anti-foam active material, and (iii) from 5 to 17.9% by weight of said added water.

4. A process as claimed in claim 1 wherein the anti-foam active material comprises at least one hydrophobic anti-foam active substance at least partially liquid at a temperature within the range of from 5° to 50° C.

5. A process as claimed in claim 1 wherein the anti-foam active material comprises a silicone oil.

6. A process as claimed in claim 5 wherein the anti foam active material comprises a silicone oil and a hydrophobic silica.

7. A process as claimed in claim 1 wherein the anti-foam active material comprises petroleum jelly.

8. A Process as claimed in claim 7 wherein the anti-foam active material comprises petroleum jelly and alkyl phosphate.

9. A process as claimed in claim 1 wherein said added water is added at a rate of from 0.3 to 15 parts by weight of water per minute per 100 parts by weight of said starch.

10. A process as claimed in claim 1 wherein said added water is added at a rate of from 1 to 10 parts by weight of water per minute per 100 parts by weight of the hydrophilic starch.

11. A process as claimed in claim 1 wherein said added water is added by contacting the mixture with water vapor at a relative humidity of at least 10%.

12. A process according to claim 1 wherein the detergent powder composition comprises 5 to 40% by weight of at least one detergent active compound, 1 to 90% by weight of at least one detergency builder and from 0.1 to 5% of said particulate anti-foam ingredient.

13. A process according to claim 12 wherein said composition comprises from 0.5 to 3% by weight of said particulate anti-foam ingredient.

* * * * *